(12) United States Patent
Shibata

(10) Patent No.: US 9,048,572 B2
(45) Date of Patent: Jun. 2, 2015

(54) CONNECTOR CONNECTING BOLT, CONNECTOR AND CONNECTOR ASSEMBLY

(71) Applicant: Sumitomo Wiring Systems, Ltd., Yokkaichi, Mie (JP)

(72) Inventor: Takahiro Shibata, Yokkaichi (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 98 days.

(21) Appl. No.: 13/798,585

(22) Filed: Mar. 13, 2013

(65) Prior Publication Data

US 2013/0260600 A1    Oct. 3, 2013

(30) Foreign Application Priority Data

Mar. 29, 2012 (JP) ................. 2012-077788

(51) Int. Cl.
*F16B 35/00* (2006.01)
*H01R 13/621* (2006.01)
*F16B 35/04* (2006.01)
*F16B 33/00* (2006.01)

(52) U.S. Cl.
CPC ............ *H01R 13/6215* (2013.01); *F16B 35/00* (2013.01); *F16B 35/048* (2013.01); *F16B 33/004* (2013.01)

(58) Field of Classification Search
USPC ............... 411/2, 3, 5, 424, 542, 999
See application file for complete search history.

(56) References Cited

U.S. PATENT DOCUMENTS

| | | | |
|---|---|---|---|
| 4,627,759 A * | 12/1986 | Kato et al. .................... 403/2 |
| 5,201,625 A * | 4/1993 | Takenouchi et al. .......... 411/369 |
| 5,228,867 A * | 7/1993 | Nagamine ..................... 439/364 |
| 5,271,689 A * | 12/1993 | Ishii et al. ................... 403/408.1 |
| 5,419,714 A * | 5/1995 | Nagamine ..................... 439/364 |
| 5,632,642 A * | 5/1997 | Briski ............................ 439/364 |
| 5,743,756 A * | 4/1998 | Hasz et al. ..................... 439/364 |
| 6,575,787 B2 | 6/2003 | Ishikawa et al. |
| 6,739,631 B2 * | 5/2004 | Smith et al. .................... 285/337 |
| 8,348,689 B2 * | 1/2013 | Shibata ......................... 439/271 |
| 8,545,153 B2 * | 10/2013 | Smith et al. ................... 411/107 |
| 2010/0143074 A1 * | 6/2010 | Sumiya et al. |

FOREIGN PATENT DOCUMENTS

GB    2291156    1/1996

OTHER PUBLICATIONS

European Search Report, Jul. 2013.

* cited by examiner

*Primary Examiner* — Flemming Saether
(74) *Attorney, Agent, or Firm* — Gerald E. Hespos; Michael J. Porco; Matthew T. Hespos

(57) ABSTRACT

A bolt (10) includes a flange (14) that bulges radially out near a head (12) at one axial end. The flange (14) contacts a second connector (60) at a proper connection to prevent further tightening. A stepped recess (16) is located between the head (12) and a screw portion (13), and is recessed sufficiently to fracture when an excessive tightening torque is applied. A retaining groove (18) is located between the stepped recess (16) and the screw portion (13) and is recessed radially inwardly and receives a retaining ring (80) for preventing detachment of the bolt (10) from a first connector (40) by contacting the first connector (40) before connection. Seal grooves (15) are located between the stepped recess (16) and the flange (14) for receiving seals (30) to be held in close contact with the first connector (40) in a liquid-tight manner at the time of proper connection.

16 Claims, 9 Drawing Sheets

CONNECTOR CONNECTING BOLT, CONNECTOR AND CONNECTOR ASSEMBLY

BACKGROUND OF THE INVENTION

1. Field of the Invention

The invention relates to a connector connecting bolt, a connector to be connected by that bolt and a corresponding connector assembly.

2. Description of the Related Art

U.S. Pat. No. 6,575,787 discloses a connector connecting bolt and a connector to be connected by that bolt. The bolt includes a shaft that is long in an axial direction. A head is provided at one axial end of the shaft and externally threads are provided on the other axial end part of the shaft. The bolt is mounted in a first connector. First and second connectors are fit lightly together and a rotational force is applied to the head with the bolt mounted in the first connector. Thus, the externally threads engage threadedly with a nut mounted in the second connector. The second connector is pulled toward the first connector as the externally thread screw into the nut. As a result, the first and second connectors are connected properly. A seal is sandwiched resiliently between the head of the bolt and the first connector when the connectors connected are properly, thereby providing liquid-tight sealing between the bolt and the first connector.

Sealing between a bolt and a connector can be achieved by providing a groove on the shaft and mounting the bolt in the connector with a seal, such as an O-ring, fit in the groove. Sealing may be impaired if the surface of the groove is damaged. Thus, surface accuracy of the groove must be managed strictly. However, bolts may catch each other in a plating process or during transportation, and the leading end of another bolt or the like may enter the groove to contact and scratch the groove surface.

The invention was completed in view of the above and an object thereof is to maintain good sealing by preventing damage to the surface of a seal groove of a bolt.

SUMMARY OF THE INVENTION

The invention relates to a connector connecting bolt that is mountable in a first connector and connectable to a mating second connector. The bolt has a head at a first axial end part and a screw portion at or near a second axial end part. A flange bulges radially out adjacent to the head and can contact the second connector at the time of proper connection to prevent any further tightening of the bolt. At least one stepped recess is recessed radially in at a position closer to the first axial end than the screw portion and can be fractured when an excessive tightening torque is applied. At least one retaining groove is recessed radially in at a position between the stepped recess and the screw portion in an axial direction and can receive a retaining member that contacts the first connector before connection for preventing detachment of the bolt from the first connector. At least one seal groove is located between the stepped recess and the flange in the axial direction and is recessed radially in for receiving at least one seal and holding the seal in close fluid-tight contact with the first connector at the time of proper connection.

Another bolt could be urged toward the seal groove from one axial end. However, the leading end of this other bolt interferes with the flange and cannot enter the seal groove. Another bolt that is urged toward the seal groove from the other axial end will interfere with the stepped recess cannot enter the seal groove. Thus, the surface of the seal groove will not be damaged even if the bolts are caught with each other. As a result, a predetermined sealing ability can be maintained.

The thickness of a flange may be larger than the width of a seal groove so that a flange of another bolt cannot contact and damage the surface of the seal groove when bolts are caught.

The bolt may have at least one auxiliary recess that is recessed radially at an axial end of the stepped recess. A jig can be urged toward the auxiliary recess after the fracture of the stepped recess. However, the leading end of the other bolt that is urged toward the auxiliary recess when the bolts are caught is guided to the stepped recess, thereby reliably preventing damage to the surface of the seal groove.

A diameter of a bottom surface of the stepped recess may be smaller than a diameter of the screw portion.

The stepped recess may have a smallest diameter of the bolt.

The auxiliary recess may be less deep than the stepped recess and/or deeper than the seal groove.

The auxiliary recess may be wider the stepped recess.

A width and depth of the seal groove may be set so that a shaft leading end of another connector connecting bolt does not contact a groove surface of the seal groove of the bolt even if the other bolt faces in an opposite direction relative to the bolt and interferes in an inclined posture.

A thickness of the flange and a width and depth of the seal groove may be set so that the flange of another connector connecting bolt does not contact a groove surface of the seal groove even if the other bolt substantially faces in the same direction as the bolt and interferes in a horizontal or inclined posture.

A retaining groove may be less deep than the seal groove.

The invention also relates to a connector to be connected to a mating connector by the above-described bolt. The connector includes a tubular portion with a bolt insertion hole configured so that the bolt is insertable therethrough and is movable in the axial direction between an initial position before connection and a connection position after connection while penetrating through the bolt insertion hole.

The seal fit in the seal groove may be exposed from one axial end opening edge of the tubular portion and the retaining member may be in contact with another axial end opening edge of the tubular portion at the initial position.

The seal member may closely contact the inner peripheral surface of the tubular portion and the tubular portion may be configured so that the flange is in contact with the one axial end opening edge of the tubular portion at the connection position.

The connector may be connectable to the mating connector by the screw portion of the bolt when a rotational force is applied to the head at one axial end so that the mating connector is pulled toward the connector by screwing of screw portion.

According to this embodiment, a state of the seal can be confirmed visually before connection, so that the seal can be replaced in advance if damaged. Further, the seal can be held in an uncompressed state before connection so that satisfactory sealing performance can be exhibited. Furthermore, the bolt is held at the initial position and the connection position so that handling is excellent.

According to a further aspect of the invention, there is further provided a connector assembly comprising the above-described connector and a mating connector connectable to the connector my rotation of the bolt.

These and other objects, features and advantages of the invention will become more apparent upon reading the following detailed description of preferred embodiments and accompanying drawings.

DETAILED DESCRIPTION OF THE PREFERRED EMBODIMENTS

Figure 7:
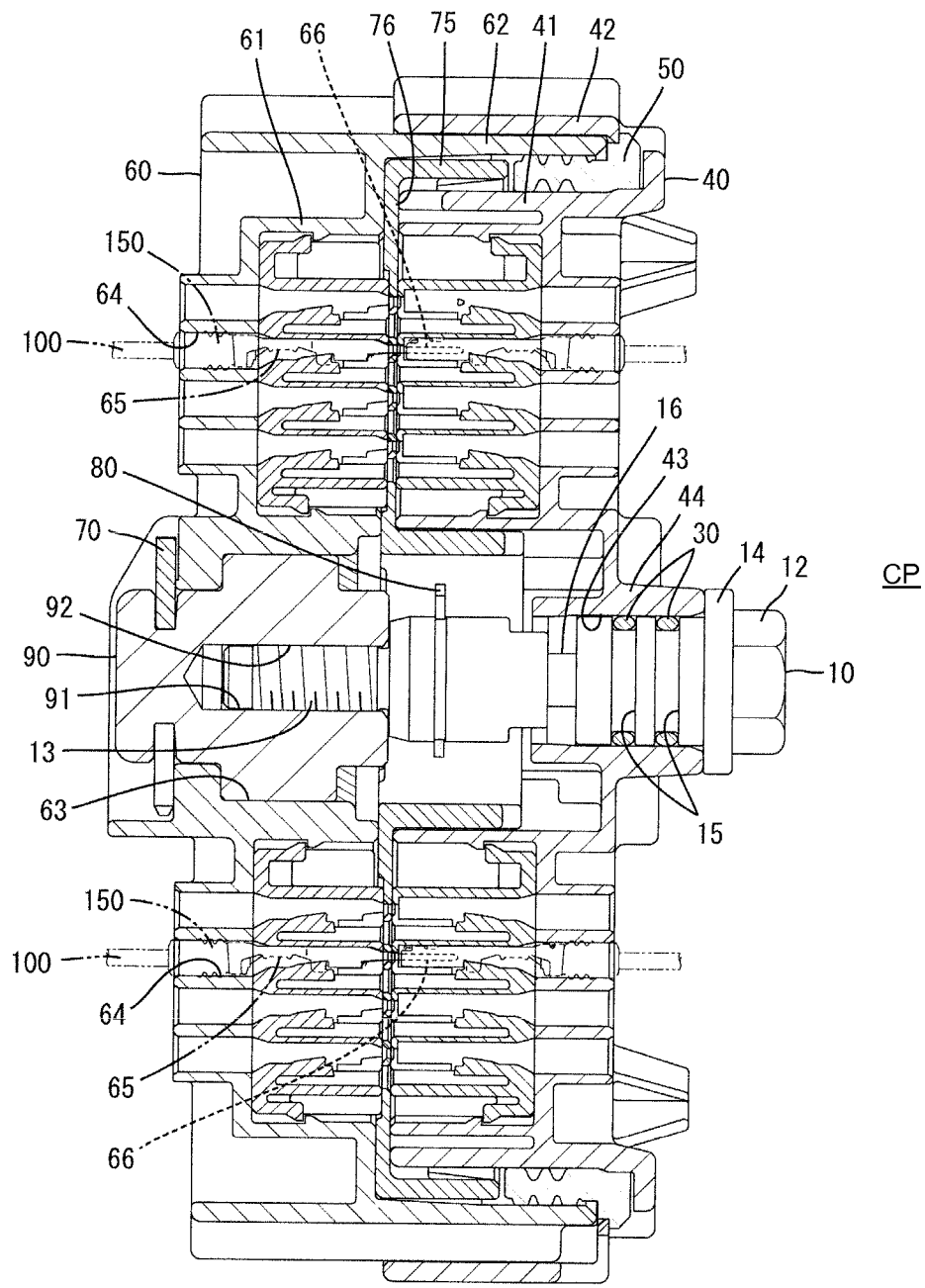
FIG. 7 is a section showing a state where first and second connectors are connected properly.
Figure 8:
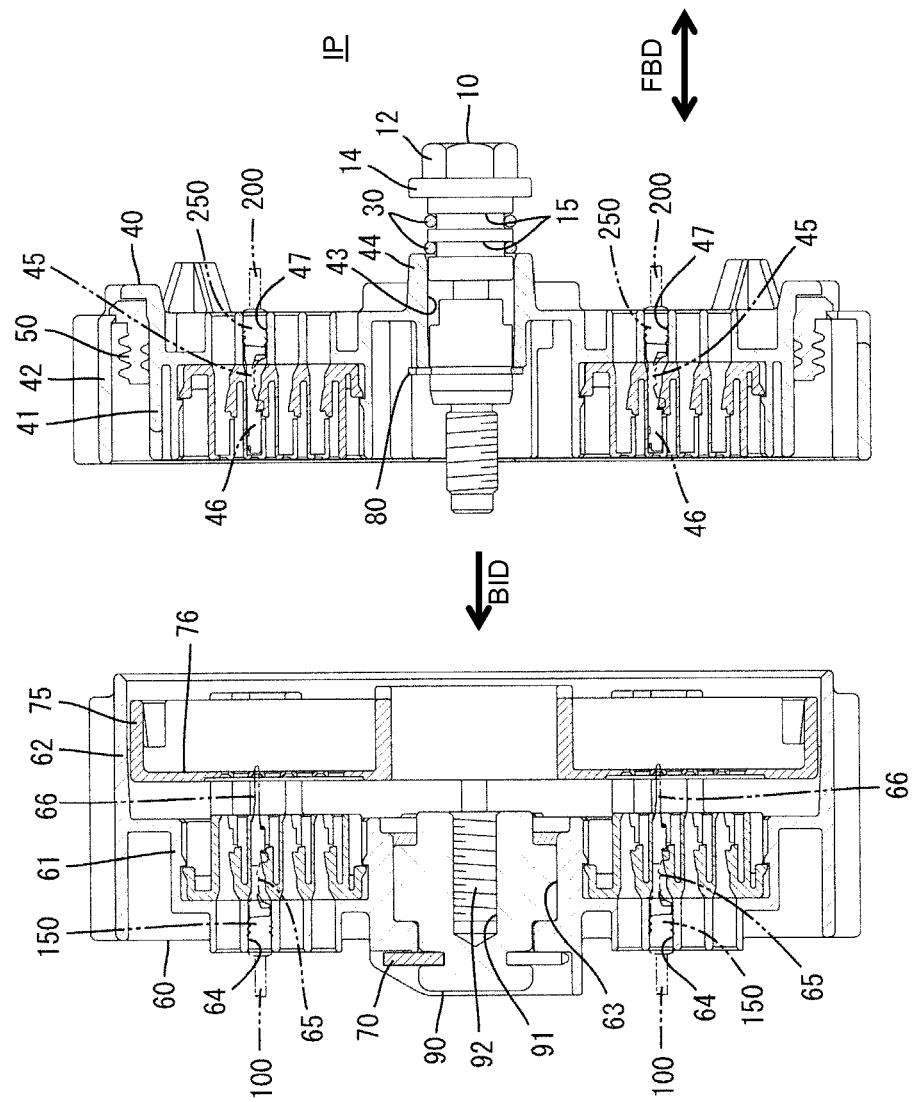
FIG. 8 is a section showing the first and second connectors separated.

A connector assembly in accordance with the invention has first and second connectors 40, 60 that are connectable to each other, as shown in FIGS. 7 and 8. A bolt 10 is mounted in the first connector 40 and a nut 90 is mounted in the second connector 60. The bolt 10 can be screwed into the nut 90 for connecting the first and second connectors 40, 60 to each other. In the following description, connection surfaces of the first and second connectors 40, 60 are referred to as front ends concerning forward and backward directions FBD.

As shown in FIG. 8, the second connector 60 includes a substantially flat block shaped second housing 61 and a substantially tubular receptacle 62 projects forward from the peripheral edge of the front end of the second housing 61. A nut mounting hole 63 is provided in a substantially central part of the second housing 61. The nut 90 is inserted into the nut mounting hole 63 and retained by a stopper 70. A bolt receiving bore 91 extends in forward and backward directions FBD (axial direction) in the nut 90 and is open on the front. The inner peripheral surface of the bolt receiving bore 91 is threaded spirally to form a screw receiving portion 92. However, that the bolt receiving bore 91 may have a different configuration, such as a bayonet configuration.

Second cavities 64 extend in forward and backward directions FBD in the second housing 61 adjacent to and substantially around the nut mounting hole 63. A male terminal fitting 65 is inserted into each second cavity 64 from behind. A tab 66 projects at a front end of the male terminal fitting 65. A rear end of the male terminal fitting 65 is connected electrically to a wire 100 and is crimped into connection with a resilient rubber plug 150 that is fit on an end portion of the wire 100. The resilient plug 150 is to be inserted into the second cavity 64 together with the male terminal fitting 65 and closely contacts the inner peripheral surface of the second cavity 64 for sealing the interior of the second housing 61 in a fluid- or liquid-tight manner. Further, the tab 66 projects into the receptacle 62 when the male terminal fitting 65 is inserted properly into the second cavity 64.

A moving plate 75 is mounted in the receptacle 62 and moves back in an insertion direction of the first connector 40 into the receptacle 62 in a connection process of the first and second connectors 40, 60. As shown in FIG. 8, leading ends of the tabs 66 are surrounded by a front wall 76 of the moving plate 75 before the first and second connectors 40, 60 are connected to avoid interference of external matter with leading ends of the tabs 66. The second housing 61 and the receptacle 62 are made e.g. of synthetic resin and the male terminal fittings 65 and the nut 90 are made of metal.

As shown in FIG. 8, the first connector 40 includes a substantially flat block shaped first housing 41 and a fitting tube 42 at least partly surrounds the first housing 41. The receptacle 62 is inserted into a space between the first housing 41 and the fitting tube 42 when the first and second housings 40, 60 are connected properly, as shown in FIG. 7. A tubular portion 44 is provided in a substantially central part of the first housing 41 and a bolt insertion hole 43 extends along forward and backward directions FBD in the tubular portion 44. The bolt 10 is to be mounted to penetrate through the bolt insertion hole 43.

Figure 9:
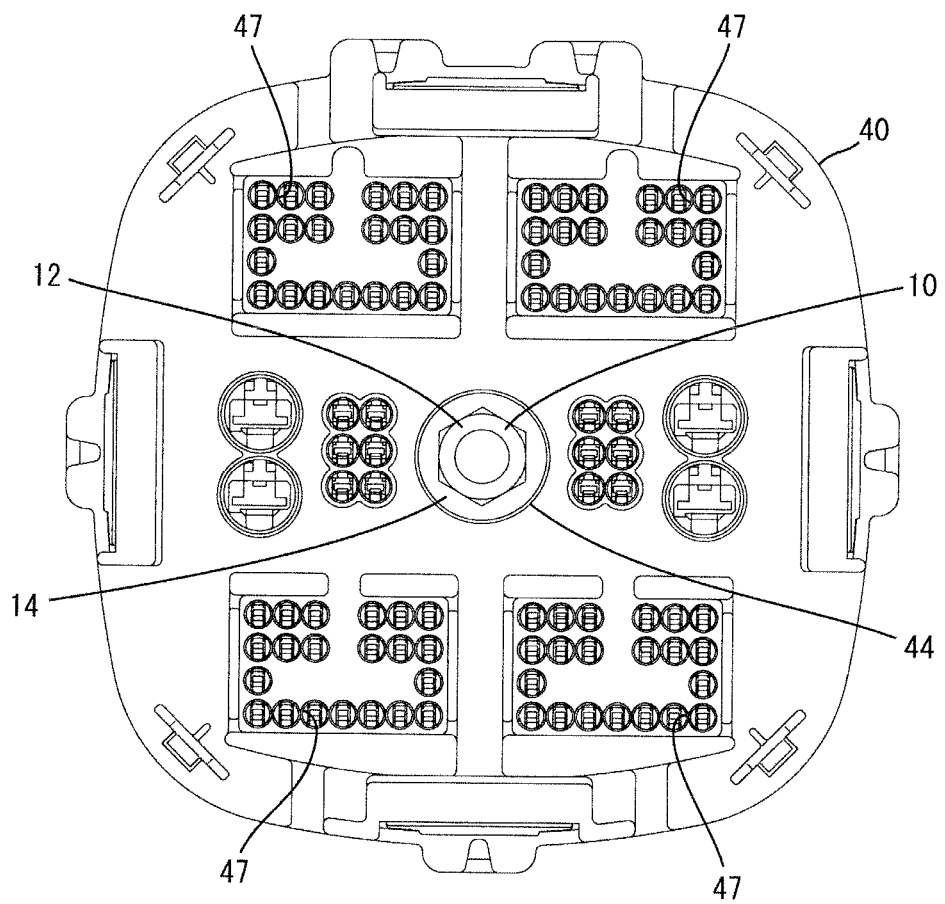
FIG. 9 is a rear view of the first connector.

First cavities 47 extend in forward and backward directions FBD in the first housing 41 and are formed adjacent to and substantially around the tubular portion 44, as shown in FIG. 9. A female terminal fitting 45 is to be inserted into each first cavity 47 from behind, as shown in FIG. 8. A box portion 46 is formed at the front end of the female terminal fitting 45 and can receive and connect to the tab 66. Rear parts of the female terminal fitting 45 are connected electrically to a wire 200 and are crimped and connected to a resilient rubber plug 250 fit on an end portion of the wire 200. The resilient plug 250 is inserted into the first cavity 47 together with the female terminal fitting 45 and closely contacts the inner peripheral surface of the first cavity 47 for sealing the interior of the first housing 41 in a fluid- or liquid-tight manner. At least one seal ring 50 is mounted on the outer peripheral surface of the first housing 41. The seal ring 50 is sandwiched resiliently between the receptacle 62 and the first housing 41 when the first and second connectors 40, 60 are connected properly, as shown in FIG. 7, thereby sealing between the first and second connectors 40, 60 in a fluid- or liquid-tight manner. Note that the first housing 41 and the fitting tube 42 are made e.g. of synthetic resin and the female terminal fittings and the bolt 10 are made of metal.

Figure 1:
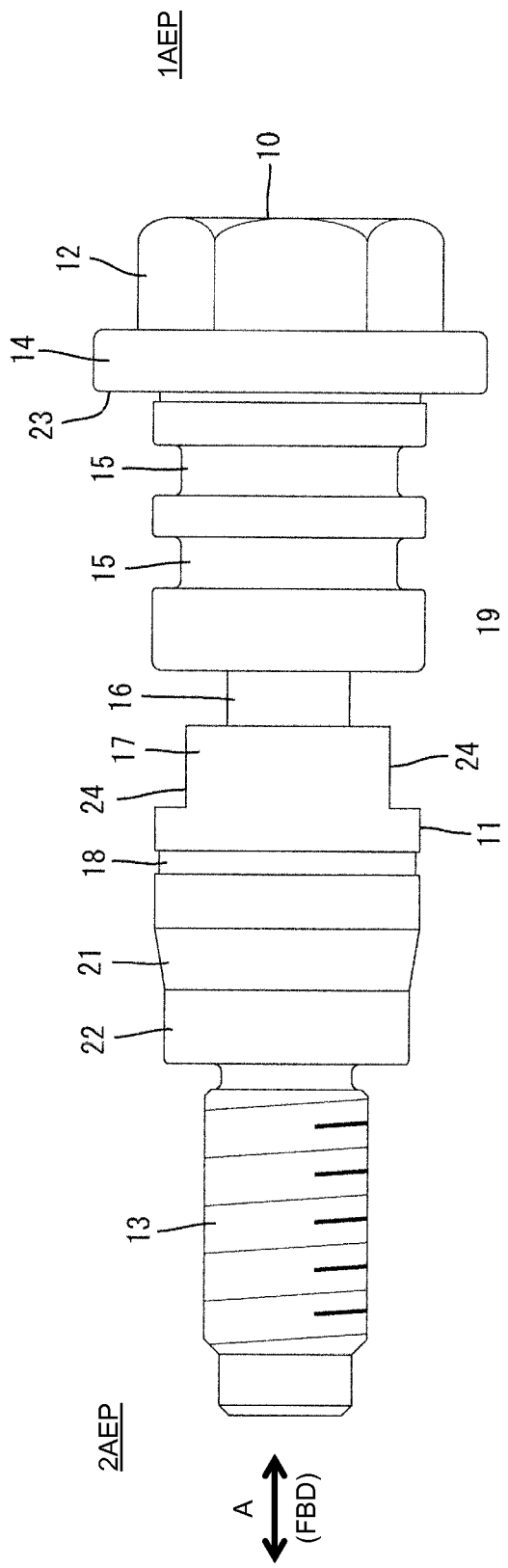
FIG. 1 is a side view of a bolt according to an embodiment of the invention.

As shown in FIG. 1, the bolt 10 has a long and narrow shaft 11 extending in forward and backward directions FBD (axial direction A). A head 12 bulges radially out from a first axial end part 1AEP at the rear of the shaft 11 and has a non-cylindrical shape (such as hexagonal or rectangular) when viewed from behind. A screw portion 13 is provided on a second axial end part 2AEP at the front of the shaft 11 and is threadedly engageable with the bolt receiving portion 91. A flange 14, seal grooves 15, a stepped recess 16, an auxiliary recess 17, a retaining groove 18, a guide 21 and a flat portion 22 are arranged substantially adjacent one another on the shaft 11 in forward and backward directions FBD (axial direction A) between the head 12 and the screw portion 13. The flange 14, the seal grooves 15, the stepped recess 16, the auxiliary recess 17, the retaining groove 18, the guide portion 21 and the flat portion 22 are provided on a trunk 19 that has a larger diameter than the screw portion 13 on the shaft 11.

The flange 14 bulges radially out over substantially the entire circumference and is adjacent to the front end of the head 12. The front surface of the flange 14 defines a bearing surface 23 that rests on a rear end opening edge of the tubular portion 44 when the first and second connectors 40, 60 are connected properly.

The seal grooves 15 are formed by recessing the outer peripheral surface of the trunk 19 over the entire circumference and are arranged right before the flange portion 14. In this embodiment, two seal grooves 15 are arranged at a short distance from each other in forward and backward directions FBD (axial direction A). Each seal groove 15 is narrower than the thickness of the flange 14 in forward and backward directions FBD. As shown in FIG. 8, two substantially ring-shaped seals 30 are fit in the respective seal grooves 15. The seals 30 are made of a resilient material, particularly of rubber, such as silicon rubber, and closely fit in the seal grooves 15 and bulge out from the seal grooves 15 when fit in the seal grooves 15.

The stepped recess 16 is recessed the outer peripheral surface of the trunk 19 over substantially the entire circumference and is arranged before the seal grooves 15. As shown in FIG. 1, the diameter of the bottom surface of the stepped recess 16 is smaller than the diameter of the screw portion 13, and preferably defines the smallest diameter on the bolt 10. The stepped recess 16 fractures when an excessive tightening torque is applied to the shaft 11 and the bolt 10 separates into two parts at the stepped recess 16.

The auxiliary recesses 17 are formed by recessing upper and lower parts of the outer peripheral surface of the trunk 19 and are continuous with the front end of the stepped recess 16 via at least one step. The auxiliary recesses 17 are not as deep as the stepped recess 16, but are deeper than the seal grooves 15. Further, the auxiliary recesses 17 are wider than the stepped recess 16 in the axial direction A. The auxiliary recesses 17 define flat surfaces 24 paired in a radial direction. The bolt 10 can be removed by bringing an unillustrated jig into contact with the flat surfaces 24 and rotating after the stepped recess 16 is fractured. Note that the auxiliary recesses 17 are arranged in an axially intermediate part of the entire bolt 10 in forward and backward directions FBD.

The retaining groove 18 is recessed over the entire outer circumference of the trunk 19 at a position before the auxiliary recesses 17. The depth of the retaining groove 18 is not as deep as the seal grooves 15. As shown in FIG. 8, a substantially C-shaped retaining ring 80 can be mounted in the retaining groove 18. Specifically, the retaining ring 80 is made of metal, and is hooked to the retaining groove 18 and projects out from the retaining groove 18 when mounted in the retaining groove 18.

As shown in FIG. 1, the tapered guide 21 is formed on the outer peripheral surface of the trunk 19 at a position before the retaining groove 18 and reduces a diameter toward the front. The retaining ring 80 slides on the guide 21 and resiliently widens in the process of mounting the retaining ring 80. The properly mounted retaining ring 80 is displaced in a return direction to be locked in the retaining groove 18.

The cylindrical portion 22 extends continuously forward from the front end of the guide 21 to the front end of the trunk 19 and has a uniform diameter equal to the diameter of the front end of the guide 21. One or more radial steps are formed at the front end of the cylindrical portion 22, the front and/or rear ends of the retaining groove 18, the front ends of the auxiliary recesses 17, the front and/or rear ends of the stepped recess 16, the front and/or rear ends of the seal grooves 15 and/or the front and/or rear ends of the flange 14.

The bolt 10 is movable relative to the first connector 40 in forward and backward directions FBD (axial direction A) between an initial position IP before connection and a connection position CP after connection and can be held at the initial position IP and the connection position CP with movements thereof restricted as shown in FIGS. 8 and 7.

A multitude of bolts 10 usually are gathered at the time of plating or transportation. Hence, there is a possibility that the bolts 10 are caught with each other and the groove surface of the seal groove 15 is damaged by another bolt 10A. However, the above-described structure of the bolt 10 avoids damage of the seal groove 15.

Figure 6:
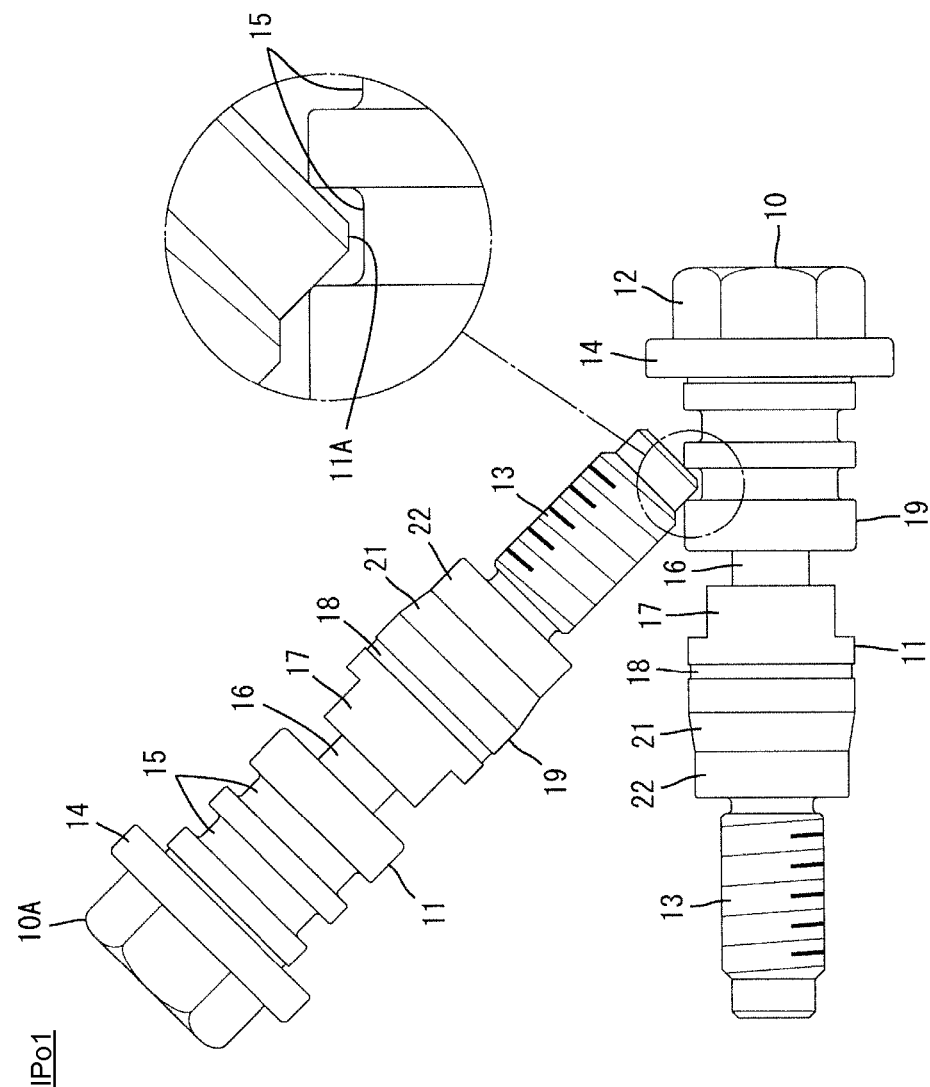
FIG. 6 is a side view showing a state where the leading end of the shaft of the other bolt is not in contact with the groove surface of the seal groove.

The width and depth of the seal grooves 15 are set so that a leading end 11A of another bolt 10A does not contact the groove surfaces of the seal grooves 15 of the bolt 10 even if the other bolt 10A faces in an opposite direction relative to the bolt 10 and interferes in an inclined posture IPo1, for example, as shown in FIG. 6.

Figure 4:
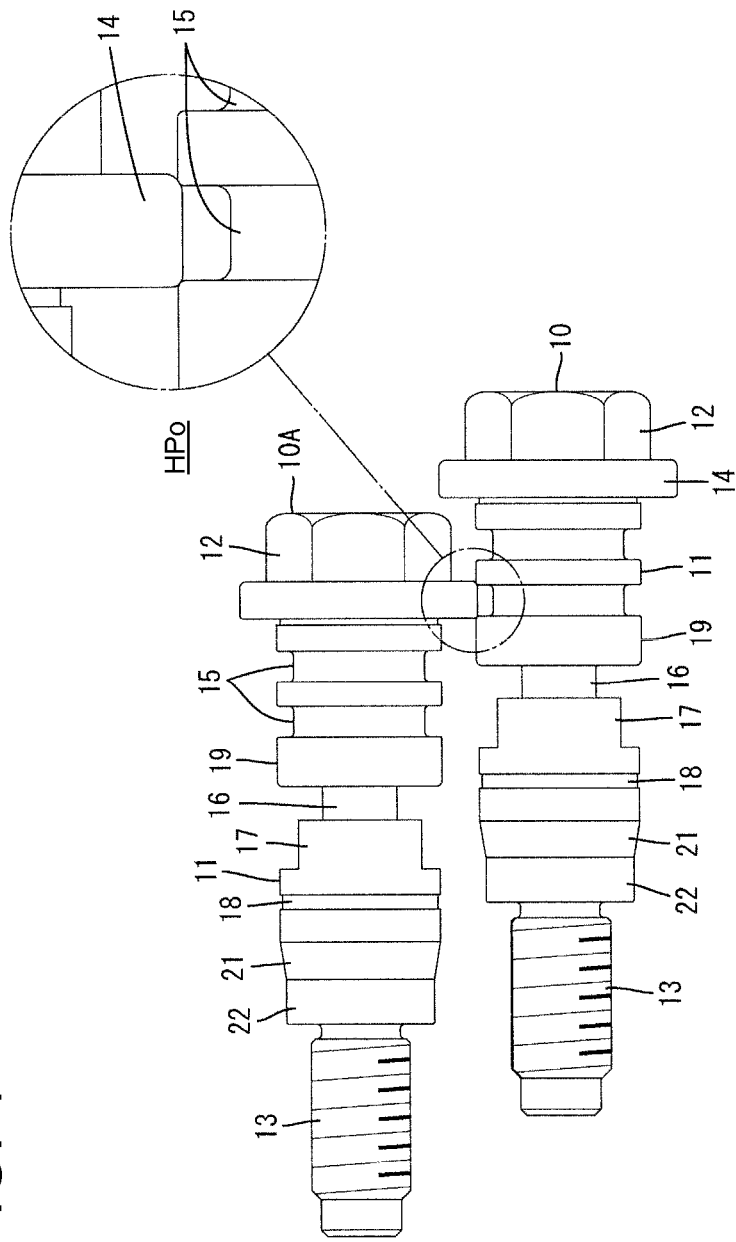
FIG. 4 is a side view showing a state where a flange of the other bolt is not in contact with the groove surface of a seal groove.
Figure 5:
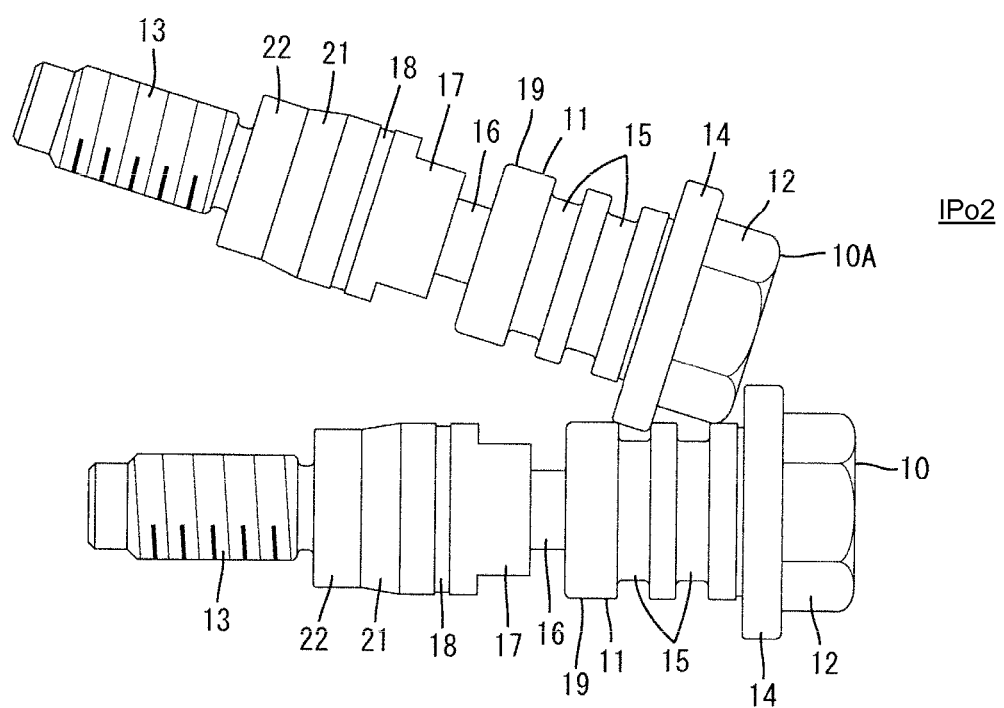
FIG. 5 is a side view showing a state where the other bolt is inclined further.

The thickness of the flange 14 and the width and depth of the seal grooves 15 are set so that the flange 14 of the other bolt 10A does not contact the groove surfaces of the seal grooves 15 of the bolt 10 even if the other bolt 10A faces in the same direction as the bolt 10 and interferes in a horizontal posture HPo or inclined posture IPo2, for example, as shown in FIGS. 4 and 5.

Figure 3:
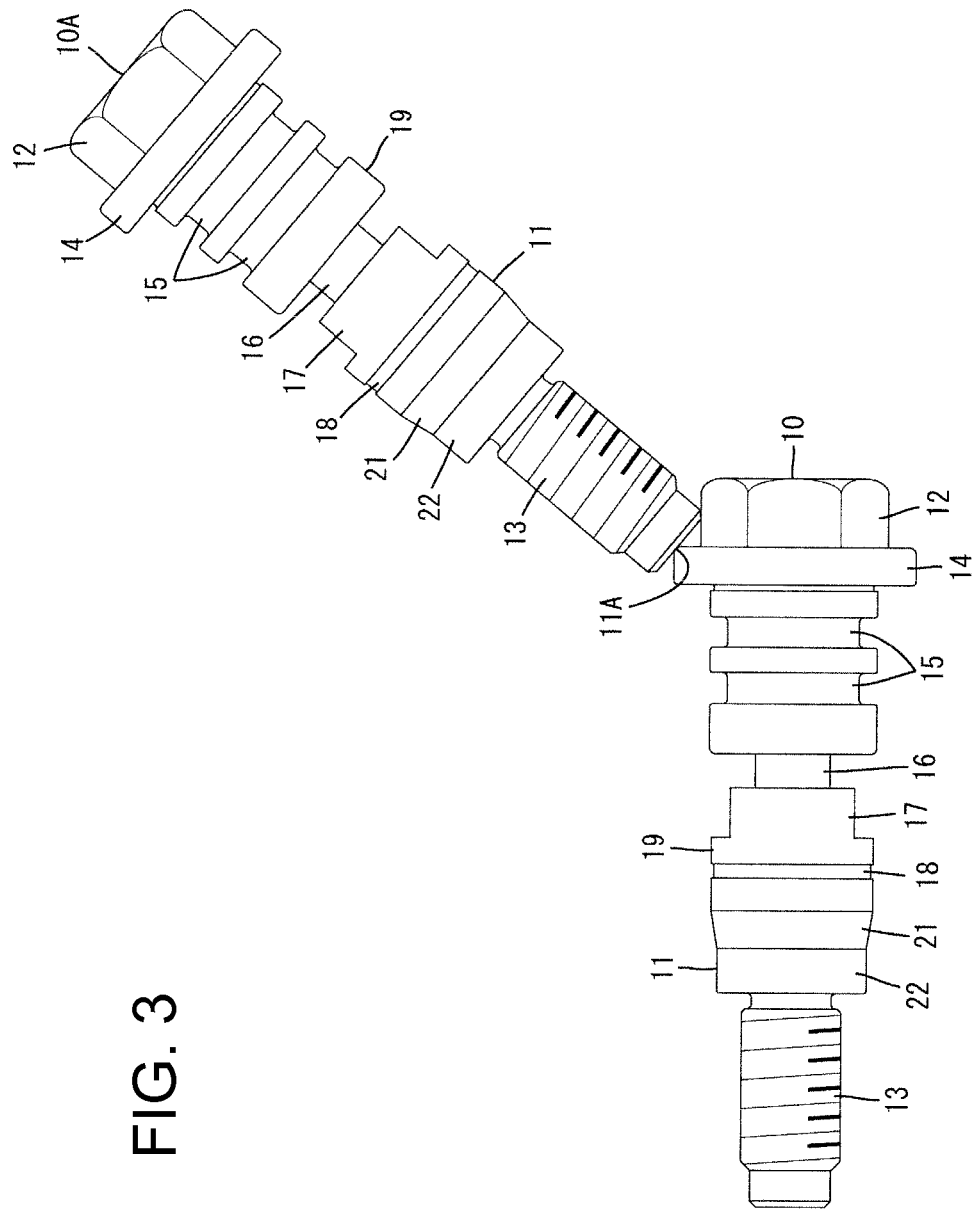
FIG. 3 is a side view showing a state where the leading end of the shaft of the other bolt interferes with a flange.

Further, even if the other bolt 10A faces in the same direction as the bolt 10 and comes in an inclined posture from behind, for example, as shown in FIG. 3, the leading end 11A of the other bolt 10A interferes with the rear end of the flange 14 of the bolt 10 to prevent any further forward movement of the other bolt 10A. Thus, the leading end 11A of the other bolt 10A cannot enter the seal grooves 15.

Figure 2:
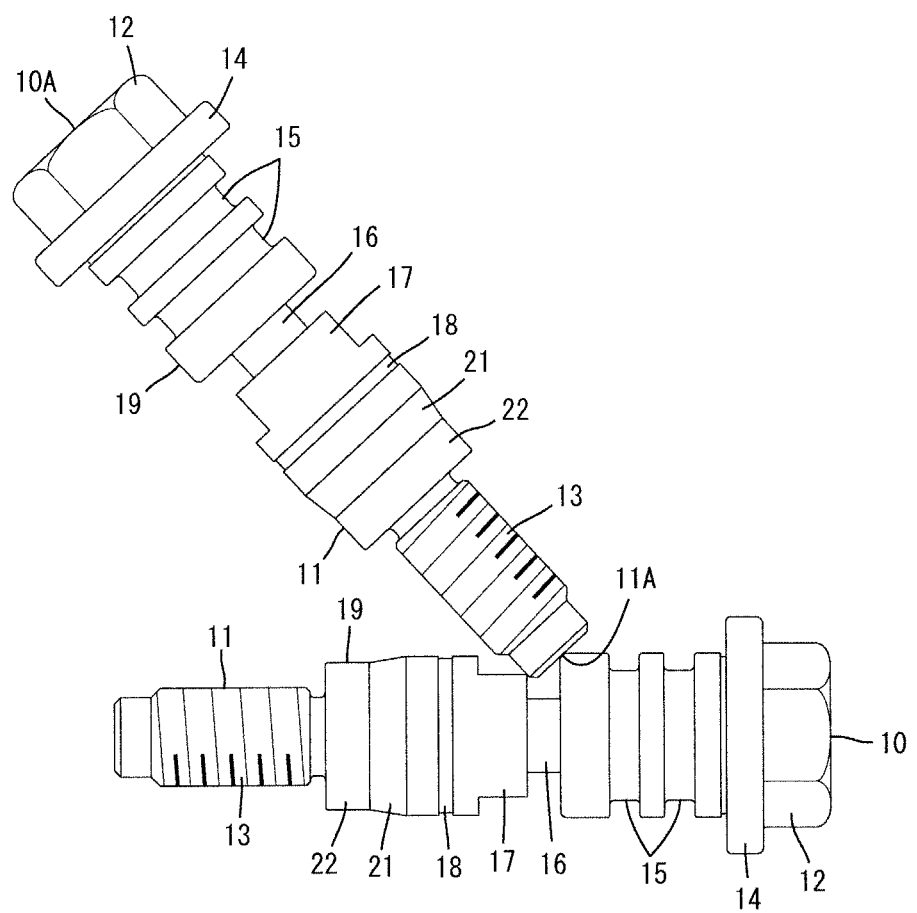
FIG. 2 is a side view showing a state where a leading end of a shaft of another bolt interferes in a stepped recess.

The other bolt 10A may face in an opposite direction relative to the bolt 10 and may come in an inclined posture from the front, for example, as shown in FIG. 2. However, the leading end 11A of the other bolt 10A will interfere with the rear end of the stepped recess 16, thereby preventing any further backward movement of the other bolt 10A. Thus, the leading end 11A of the other bolt 10A cannot enter the seal grooves 15.

The stepped recess 16 is dropped from the auxiliary recesses 17 via a step. Thus, the leading end 11A of the other bolt 10A slides on the groove bottom of the auxiliary recess 17 and is guided to the stepped recess 16. Specifically, any further backward movement of the other bolt 10A also is prevented by the hooking engagement of the leading end 11A of the other bolt 10A coming from the front with the rear end of the retaining groove 18. Thus, entry of the other bolt 10A into the seal grooves 15 is prevented more reliably.

Seals 30 are fit into the respective seal grooves 15 of the bolt 10 and, in that state, the bolt 10 is inserted into the tubular portion 44 of the first connector 40 from the insertion side, particularly substantially from behind. The seal 30 in the front seal groove 15 contacts the rear opening edge of the tubular portion 44 when the bolt 10 penetrates sufficiently through the bolt insertion hole 43 to reach the initial position IP, as shown in FIG. 8, and prevents any further insertion of the bolt 10. Further, the retaining ring 80 mounted in the retaining groove 18 contacts a front opening edge of the tubular portion 44 to prevent the bolt 10 from being detached backward. In this way, the bolt 10 is held at the initial position IP with movements thereof restricted. At this time, the seals 30 fit in the seal grooves 15 are exposed to the outside from the front end opening edge of the tubular portion 44, so that an operator can visually confirm states of the both seals 30.

Subsequently, the first and second connectors 40, 60 are arranged substantially right opposite to each other and, in that state, are connected to each other. The leading end 11A of the bolt 10 initially is inserted in the bolt inserting direction BID into the bolt receiving portion 91 of the nut 90. An unillustrated jig then is brought into contact with the head 12 of the bolt 10 and rotated. As a result, the shaft 11 rotates about the axis A so that the screw 13 threadedly engages the screw receiving portion 92 and the bolt 10 is screwed into the nut 90. The first and second connectors 40, 60 are connected more as the bolt 10 is screwed. The female and male terminal fittings 45, 65 are connected properly to each other when the first and second connectors 40, 60 are connected properly to each other, as shown in FIG. 7. Further, the flange 14 contacts the rear opening edge of the tubular portion 44 when the first and second connectors 40, 60 are connected properly to each other, thereby preventing any further spiral insertion of the bolt 10. Further, at the time of proper connection, the seals 30 are accommodated in the tubular portion 44 and are held resiliently in close contact with the inner peripheral surface of the tubular portion 44. In this way, the interior of the tubular portion 44 is sealed in a fluid- or liquid-tight manner to prevent entry of fluid, such as water, into a connection area between the first and second connectors 40, 60 from the outside.

As described above, another bolt 10A could be urged toward the seal groove 15 from behind while the bolts 10 are caught with each other. However, the leading end 11A of the bolt 10A interferes with the flange 14 of the bolt 10 and thus cannot enter the seal grooves 15. The other bolt 10A could be urged toward the seal grooves 15 from the front. However, the leading end 11A of the bolt 10A interferes with the stepped recess 16 of the bolt 10 and thus cannot enter the seal grooves 15. Thus, even if the bolts 10 are caught with each other, damage of the groove surfaces of the seal grooves 15 is prevented. As a result, a specified sealing ability can be maintained.

The flange 14 is thicker in the axial direction A than the width of the seal grooves 15 in the axial direction A. Thus, the flange 14 of the other bolt 10A cannot contact the groove surfaces of the seal grooves 15 of the bolt 10 when the bolts 10, 10A are caught with each other. As a result, damage of the groove surfaces of the seal grooves 15 is prevented more reliably.

The auxiliary recesses 17 are continuous with the stepped recess 16 and are contacted by the jig after the fracture of the stepped recess 16. However, the leading end 11A of the other bolt 10A trying to enter from front is guided from the auxiliary recess 17 to the stepped recess 16 when the bolts 10, 10A are caught with each other and is restricted from entering the seal grooves 15.

The seals 30 are exposed to the outside from the rear opening edge of the tubular portion 44 when the bolt 10 is held at the initial position IP. Thus, the states of the seals 30 can be confirmed visually before connection. As a result, the seal 30 can be replaced in advance if it is damaged. Further, the seals 30 initially are held in an uncompressed state so that satisfactory sealing performance can be exhibited. Furthermore, handling is excellent since the bolt 10 is held at the initial position and the connection position.

The invention is not limited to the above described embodiment. For example, the following embodiments also are included in the scope of the invention.

Only one seal groove may be formed on the outer peripheral surface of the shaft and the seal may be fit in this one seal groove.

The head and the flange may be spaced apart from each other.

The bolt may be a square head bolt with a head of a rectangular shape when viewed from behind.

What is claimed is:

1. Connector connecting bolts, each of the connector connecting bolts being mountable in a first connector and being connectable to a mating second connector, each of the connector connecting bolts comprising:
a head at or near a first axial end part;
a screw portion at or near a second axial end part spaced from the first axial end part in an axial direction of the connector connecting bolt;
a flange bulging radially out adjacent to the head and being engageable with the first connector when properly connected to prevent any further tightening of the bolt;
at least one stepped recess between the first axial end part and the screw portion, and being recessed radially inwardly a sufficient amount to be fractured when an excessive tightening torque is applied;
at least one retaining groove between the stepped recess and the screw portion in an axial direction and recessed radially inward for receiving a retaining member that contacts the first connector before connection of the first and second connectors for preventing detachment of the bolt from the first connector; and
at least one seal groove between the stepped recess and the flange in the axial direction and recessed radially inward for receiving at least one seal to be held in close contact with the first connector in a fluid-tight manner at the time of proper connection, wherein a thickness of the flange in the axial direction is larger than a width of the seal groove in the axial direction so that the flange of one of the bolts is not insertable into the seal groove of another of the bolts for preventing damage to the seal groove.

2. The connector connecting bolts of claim 1, wherein each of the connector connecting bolts further comprises at least one auxiliary recess adjacent an axial end of the stepped recess and between the stepped recess and the screw portion and recessed radially inward, the auxiliary recess being engageable by a jig if the stepped recess is fractured.

3. The connector connecting bolts of claim 1, wherein a bottom surface of the stepped recess on each of the connector connecting bolts has a diameter less than a diameter of the screw portion.

4. The connector connecting bolts of claim 1, wherein the stepped recess on each of the connector connecting bolts defines a smallest diameter of the respective bolt.

5. The connector connecting bolts of claim 1, wherein the auxiliary recess on each of the connector connecting bolts has a depth that is less than a depth of the stepped recess and larger than a depth of the seal groove.

6. The connector connecting bolts of claim 1, wherein a width of the auxiliary recess on each of the connector connecting bolts in the axial direction exceeds a width of the stepped recess in the axial direction.

7. The connector connecting bolts of claim 1, wherein a width of the seal groove on each of the connector connecting bolts in the axial direction and a depth of the seal groove in a radial direction are set so that a leading end of another one of the connector connecting bolts cannot contact a groove surface of the seal groove regardless of an alignment of the bolts.

8. The connector connecting bolts of claim 1, wherein a thickness of the flange on each of the connector connecting bolts in the axial direction and a width and depth of the seal groove measured respectively in the axial direction and the radial direction are set so that the flange of another connector connecting bolt cannot contact a groove surface of the seal groove of the bolt regardless of an alignment of the bolts.

9. The connector connecting bolts of claim 1, wherein a depth of the retaining groove on each of the connector connecting bolts is smaller than a depth of the seal groove.

10. A connector assembly, comprising:
a connector including a tubular portion with a bolt insertion hole; and a plurality of bolts, any one of the bolts is being insertable through the bolt insertion hole for connecting the connector assembly to a mating connector, each of the bolts comprising:
a head at or near a first axial end part;
a screw portion at or near a second axial end part;
a flange bulging radially out adjacent to the head and being engageable with the connector when properly connected to prevent any further tightening of the bolt;
at least one stepped recess between the first axial end part and the screw portion, and being recessed radially inwardly a sufficient amount to be fractured when an excessive tightening torque is applied;
at least one retaining groove between the stepped recess and the screw portion in an axial direction and recessed radially inward;
at least one seal groove between the stepped recess and the flange in the axial direction and recessed radially inward, a width of the seal groove in the axial direction being less than a thickness of the flange in the axial direction so that the flange of one of the bolts cannot damage the seal groove of another of the bolts before either of the bolts is inserted into the bolt insertion hole, the connector assembly further comprising:
a retaining member mounted in the retaining groove and contacting the connector for preventing detachment of the bolt from the connector before connection of the connector assembly and the mating connector; and
at least one seal in the seal groove and held in close contact with the connector in a fluid-tight manner, wherein the bolt that is inserted through the bolt insertion hole is movable in the axial direction between an initial position before connection and a connection position after connection while penetrating through the bolt insertion hole and wherein an absence of damage to the seal groove ensures good sealing of the seal in the seal groove.

11. The connector assembly of claim 10, wherein the seal fit in the seal groove is exposed from one axial end opening edge of the tubular portion and the retaining member is in contact with another axial end opening edge of the tubular portion at the initial position.

12. The connector assembly of claim 10, wherein the seal is held in close contact with an inner peripheral surface of the tubular portion and the tubular portion is configured such that the flange is in contact with the one axial end opening edge of the tubular portion at the connection position.

13. The connector assembly of claim 10, wherein the connector is connectable to the mating connector by the screw portion of the bolt being rotated about an axis when a rotational force is applied to the head so that the mating connector is pulled toward the connector by a screwing of the screw portion.

14. A plurality of identical bolts, each of the bolts comprising:
a head in proximity to a first axial end of the bolt;
a screw portion in proximity to a second axial end of the bolt that is spaced from the first axial end in an axial direction of the bolt;
a flange bulging radially out adjacent to the head;
at least one stepped recess between the first axial end and the screw portion, and being recessed radially inwardly a sufficient amount to fracture when a selected torque is applied;
a retaining groove between the stepped recess and the screw portion and recessed radially inward for receiving a retaining member; and
at least one seal groove between the stepped recess and the flange and recessed radially inward for receiving at least one seal, wherein a thickness of the flange in the axial direction is larger than a width of the seal groove in the axial direction so that the flange of one of the bolts is not insertable into the seal groove of another of the bolts for preventing damage to the seal groove.

15. The bolt of claim 14, further comprising at least one auxiliary recess adjacent an axial end of the stepped recess and between the stepped recess and the screw portion and recessed radially inward, the auxiliary recess being engageable by a jig if the stepped recess is fractured.

16. The bolt of claim 15, wherein a width of the auxiliary recess in the axial direction exceeds a width of the stepped recess in the axial direction.

* * * * *